Patented July 5, 1927.

1,634,795

UNITED STATES PATENT OFFICE.

CLAUDE G. MINER, OF BERKELEY, CALIFORNIA.

PROCESS OF PRODUCING PHOSPHORUS NITRIDE AND CERTAIN READILY-VOLATILE HALIDES.

No Drawing.    Application filed July 25, 1925. Serial No. 46,114.

This invention relates to the production of phosphorus nitrides and certain readily volatile halides.

Phosphorus nitride has heretofore been long known scientifically and theoretically but has not been capable of practical commercial production. It is a valuable and highly concentrated plant food.

An object of this invention is the practical and economical production of commercial quantities of phosphorus nitride.

A further object of this invention is the production of certain and readily volatile desirable halides as the reaction product of the formation of phosphorus nitride.

I have discovered that certain nitrides can be caused to react with halides of phosphorus to produce phosphorus nitride and certain readily volatile halides under conditions enabling the phosphorus nitride and halide to be separated. This reaction may be expressed as $PX + RN \rightarrow PN + RX$ in which X represents one of the halogen group and R represents a metallic radical, the formula for phosphorus nitride being $P_3N_5$. Phosphorus nitride remains a solid below its temperature of recomposition at red heat. I have determined that to enable the foregoing reaction to proceed and the reaction products to be separated the halide produced in the reaction should be volatile below the decomposition temperature of the phosphorus nitride.

In accordance with the process, aluminum nitride is caused to pass in a reaction chamber countercurrent to phosphorus chloride vapor. Upon bringing the reaction chamber to a temperature of approximately from 200° to 500° C. the reaction proceeds of itself. The heat liberated during the reaction will maintain a temperature of approximately 560° C. The reaction uses up about 1250 parts by weight of phosphorus chloride for every 410 parts by weight of aluminum nitride. Since the aluminum nitride as a solid passes through the reaction chamber in countercurrent direction to the phosphorus chloride as a vapor, the reaction will substantially completely use up in the above named proportions whichever material is in the minority. The reaction produces phosphorus nitride and aluminum chloride and may be expressed as follows:

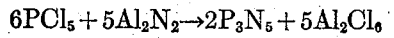

The phosphorus nitride is a solid at and below the reaction temperature whereas the aluminum chloride has a low volatilizing temperature of substantially 183° C. This enables the reaction to proceed substantially in a single direction and the aluminum chloride to separate from the phosphorus nitride. The aluminum chloride so produced and separated is valuable for use as an oil cracking agent or as a source of raw material for aluminum manufacture. In addition to producing phosphorus nitride in commercial quantities at reasonable cost this process also produces the aluminum halide at a greatly reduced cost over prior methods.

The invention is not limited to the foregoing specific example and other nitrides may be employed that will produce halides having volatilizing temperatures sufficiently below the decomposition temperature of phosphorus nitride to permit the reaction products to be separated. As a further example, silicon nitride may be contacted with phosphorus chloride and brought to a temperature at which the reaction will proceed of itself. Phosphorus nitride and silicon chloride will be produced as follows:

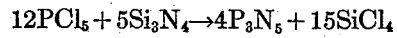

Silicon chloride has a volatilizing temperature of substantially 60° C. enabling the reaction to proceed and the reaction products to separate.

It is also contemplated that mixed or double nitrides such as nitrides of aluminum and silicon produced by treating clay in nitrogen fixation processes may be employed by this process, and in that case a typical reaction is as follows:

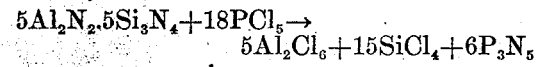

Inasmuch as both aluminum and silicon chlorides are volatilized below the decomposition temperature of phosphorus nitride it will be apparent that the reaction will proceed and the halides thus formed separate from the phosphorus nitride.

In event the nitride employed be such that so much heat be liberated in the exothermic reaction between the nitride and phosphorus halide that the decomposition temperature of phosphorus nitride be reached or too closely approximated heat may be taken from the reaction to maintain the temperature sufficiently below the decomposition temperature of phosphorus nitride, and such heat may be employed if desired through heat exchange to preheat the raw material. Where desired abnormal pressure may be employed to effect the reaction under conditions enabling the formation and separation of the halide while substantially preventing the decomposition of the phosphorus nitride. For example a reduced pressure may be employed to lower the volatilizing temperature of those halides whose volatilizing temperature at atmospheric pressure too closely approximates or exceeds the decomposition temperature of phosphorus nitride.

It will be apparent that by employing an excess of nitride to react substantially with all of the phosphorus halide a halide will be produced substantially free of phosphorus compound and that the presence of the residue of the said nitride in the phosphorus nitride does not substantially impair the same as a food plant.

The invention is capable of being put to a wide variety of uses under widely varying conditions and I do not intend to limit the same to the above disclosure except as may be required by the following claims.

I claim:

1. The process of producing phosphorus nitride and a halide which comprises causing a phosphorus halide to react with a nitride of a metallic element at a temperature between 183° C. and 560° C. to produce phosphorus nitride and a halide, and separating the halide from the phosphorus nitride.

2. The process of producing phosphorus nitride and a readily volatile halide which comprises causing a nitride of a metallic element and a phosphorus halide to react together at a temperature between 183° C. and 560° C. to produce phosphorus nitride and a halide which will be freed from the phosphorus nitride at the reaction temperature.

3. The process of producing phosphorus nitride and a volatile halide which comprises causing a nitride of a metallic element and a phosphorus halide to react together at a temperature between 183° C. and 560° C. to produce phosphorus nitride and a halide volatile below the decomposition temperature of the phosphorus nitride.

4. The process of producing phosphorus nitride and a volatile halide which comprises causing a nitride and a phosphorus halide to react together at a temperature above 183° C. and below 560° C. to produce phosphorus nitride of a metallic element and a halide volatile below the decomposition temperature of the phosphorus nitride, the reaction proceeding under conditions at which the volatile halide separates from the phosphorus nitride.

5. The process of producing phosphorus nitride and aluminum chloride which comprises causing phosphorus chloride and aluminum nitride to react together at a temperature above 183° C. and below 560° C. and produce phosphorus nitride as a solid and aluminum chloride as a gas.

6. In a process of producing phosphorus nitride and aluminum chloride the step expressed as

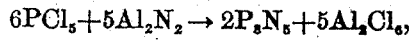

the reaction proceeding between 183° C. and 560° C.

7. A continuous process of producing phosphorus nitride and aluminum chloride which comprises concurrently producing phosphorus chloride and aluminum nitride, cooling the said products formed to a temperature below the decomposition temperature of phosphorus nitride, and contacting the same to react together at a temperature between 183° C. and 560° C.

8. The process of producing phosphorus nitride and aluminum chloride which comprises forming aluminum nitride by causing a mineral containing alumina to react at an elevated temperature in the presence of carbon and a nitrogen atmosphere concurrently with producing phosphorus chloride by causing phosphate rock and a chloride of an alkali-forming metal to react at an elevated temperature, and contacting the aluminum nitride and phosphorus chloride as so formed while retaining sufficient heat from their temperature of production to cause the same to react together at a temperature between 183° C. and 560° C.

Signed at San Francisco, Calif., this 10th day of July, 1925.

CLAUDE G. MINER.